H. W. PLEISTER.
CONDUIT OR CABLE CLAMP AND BRIDLE RING.
APPLICATION FILED OCT. 27, 1920.
1,381,235.
Patented June 14, 1921.
2 SHEETS—SHEET 1.
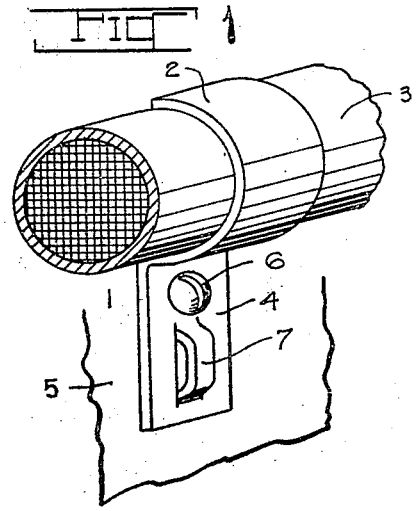
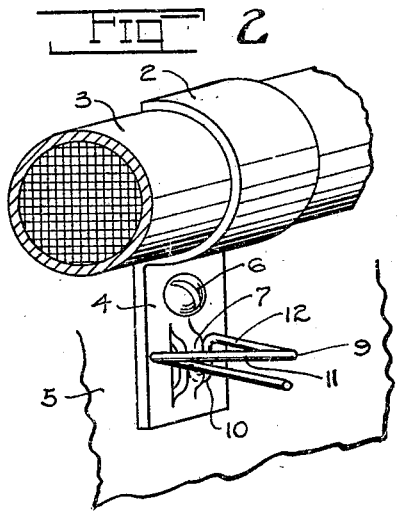
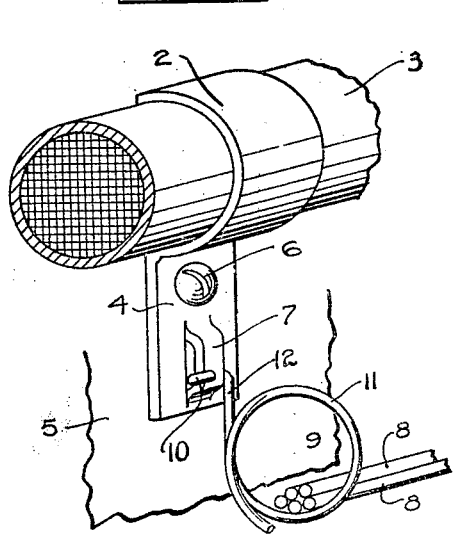
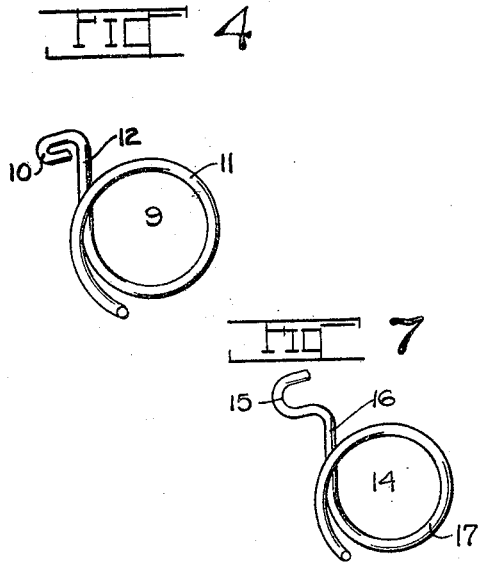
INVENTOR
Henry W. Pleister
BY
Alan Johnson
ATTORNEY

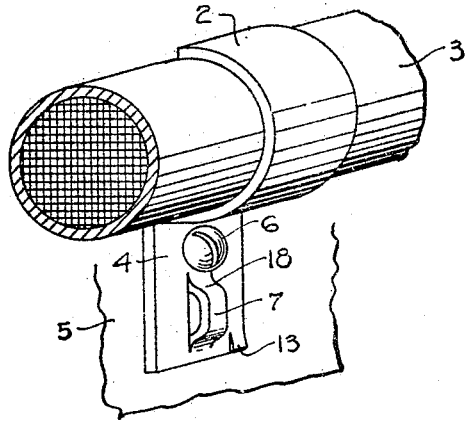
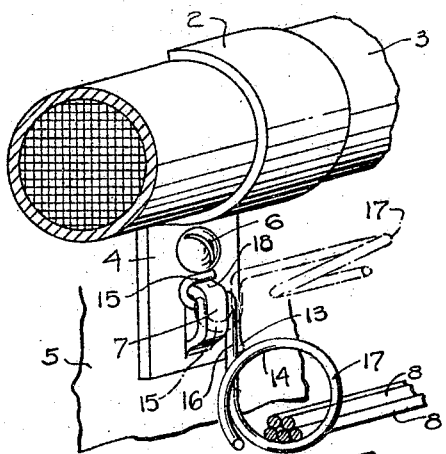
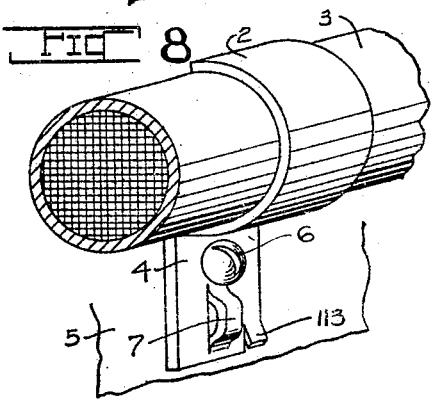
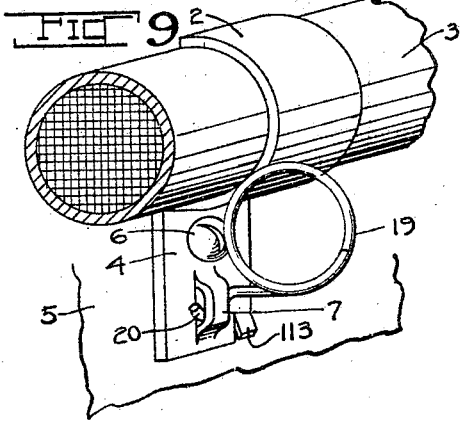
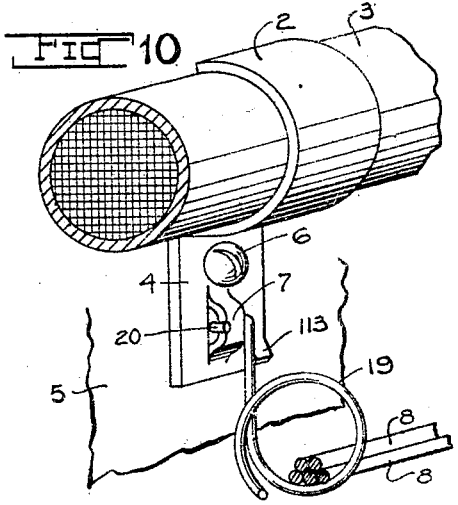
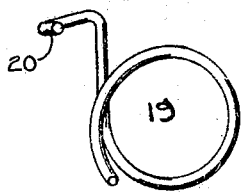

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,235. Specification of Letters Patent. Patented June 14, 1921.

Application filed October 27, 1920. Serial No. 419,829.

*To all whom it may concern:*

Be it known that I, HENRY W. PLEISTER, a citizen of the United States, residing in Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a vertical stirrup into which the locking hook of a pigtail bridle ring is hooked and from which it is suspended.

My invention further relates to such a conduit or cable clamp having not only the vertical stirrup but in addition a projection or catch on the base to engage with the bridle ring and prevent its rocking or swinging in the stirrup.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1 is a perspective view of my conduit or cable clamp and of a cable which it supports;

Fig. 2 is a perspective view of the conduit or cable clamp and cable shown in Fig. 1 and a bridle ring being attached to the vertical stirrup;

Fig. 3 is a perspective view of the conduit or cable clamp shown in Figs. 1 and 2, with the bridle ring in its operative position;

Fig. 4 is a perspective view of the bridle ring shown in Figs. 2 and 3;

Fig. 5 is a perspective view of a conduit or cable clamp, similar to Fig. 1, except that the base is provided with a projection or catch to coöperate with the bridle ring and prevent its rocking or swinging in the vertical stirrup;

Fig. 6 is a perspective view of the conduit or cable clamp shown in Fig. 5 with the addition of a pigtail bridle ring coöperating with the vertical stirrup and the projection or catch. In this figure one of the first attaching positions of the bridle ring is shown in dotted lines.

Fig. 7 is a perspective view of the bridle ring shown in Fig. 6;

Fig. 8 is a perspective view similar to Fig. 5, the projection or catch being shown a little higher.

Fig. 9 is a perspective view of the conduit or cable clamp shown in Fig. 8 and a different form of bridle ring shown in its first attaching position;

Fig. 10 is a perspective view showing the bridle ring of Fig. 9 in its operative position;

Fig. 11 is a perspective view of the bridle ring shown in Figs. 9 and 10.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form a conduit or cable clamp with a vertical stirrup adapted to have a pigtail bridle ring hooked into it, the bridle ring hanging from the stirrup and adapted to be readily attached or detached by simple manipulation.

I have shown different embodiments of my invention by way of illustration, but of course my invention is not to be confined to the particular forms illustrated. In one form I permit the bridle ring to hang loosely from the vertical stirrup so that there is more or less swing or rock to the bridle ring; excessive rocking is prevented by the runs of bridle wires 8, 8. In other forms of my invention I provide the base with a projection or catch over which the end of the pigtail bridle ring is pressed and which prevents this rocking or swinging of the bridle ring so that in this form the bridle ring is more or less rigidly secured after being once positioned. In other forms I accomplish the same result without necessarily forcing the bridle ring over the projection or catch.

In Figs. 1, 2, 3 and 4 I have shown a conduit or cable clamp 1, having a hook portion 2, which contacts with and supports a conduit or cable 3, and with a base 4, which lies against a wall or other suitable support 5, to which the conduit or cable clamp is held by the securing screw 6. I provide the base 4 with a vertical stirrup 7, which extends above the surface of the base. When the clamp is formed out of pressed sheet material which is the preferred construction, this vertical stirrup is stamped up from the base 4 as shown in Fig. 1.

When the conduit or cable 3 is first installed the bridle ring, as a rule, is not employed. It is only when the traffic load becomes excessive and the telephone or telegraph engineers desire to increase the capacity of the installation without taking down the cable 3 and substituting a larger cable that they accomplish the same result more economically by running bridle wires 8, 8 parallel to the cable. In my invention the bridle ring 9 having the locking hook 10 and the pigtail 11 is attached to the vertical stirrup 7 by simple manipulation. In Fig. 2 I have shown for example the bridle ring 9 in one of its attaching positions. From the position shown in this figure the bridle ring is rotated substantially 90° and then pulled down 90° until it assumes the position shown in Fig. 3. The locking hook 10 on the end of the bridle ring then engages the inner and outer surfaces of the vertical stirrup 7 and prevents the bridle ring being accidently disengaged from the stirrup. In this form the bridle ring, prior to stringing the runs of bridle wires, can rock or swing in the vertical stirrup 7, more or less. The bridle ring is irremovably locked to the vertical stirrup so long as one or more bridle wires 8, 8 are mounted within the bridle ring. These runs of bridle wires limit the rocking of the bridle ring in the stirrup and prevent the bridle ring from being swung far enough around to permit its extraction from the vertical stirrup.

In Figs. 5 and 6 I have shown a modification of my invention, in which the base 4, in addition to being provided with the stirrup 7, is provided with a catch or projection 13. When this conduit or cable clamp is formed from pressed sheet metal, this catch or projection is stamped up from the base so that it is raised an appreciable distance from the surface of the base. In this form of my invention I take the bridle ring 14, Fig. 7, having the locking hook 15, arm 16, and pigtail 17 and attach it to the vertical stirrup 7 as shown in Fig. 6. The bridle ring is brought into the position shown in dotted lines in Fig. 6, and is then swung down 90° and over the projection or catch 13. This projection or catch is preferably inclined so as to give a wedge surface permitting the arm 16, after passing over the projection or catch, to snap into contact with the surface of the base 4. In this form the locking hook 15 of the bridle ring engages over the upper end 18 of the vertical stirrup 7 as shown in full lines in Fig. 6. In this form of my invention the rocking or swinging of the bridle ring within the vertical stirrup in one direction is prevented by the projection or catch 13 engaging with the arm 16 of the bridle ring.

Rocking in the other direction is prevented by the shank 16 engaging with the side of the vertical stirrup 7.

In this form of my invention the removal of the bridle ring 14 from the vertical stirrup 7 is prevented by the hook 15 contacting with the head of the securing screw 6.

In Figs. 8, 9, 10 and 11 I have shown a little different form of bridle ring. In this modification a bridle ring 19 is provided with a locking hook 20. To position this form of the invention the locking hook 20 of the bridle ring 19, Fig. 11, is brought into the position shown in full lines, Fig. 9. It is then swung down 90° back of the projection or catch 113, without necessarily passing over it, as does the bridle ring shown in Figs. 5 and 6. The projection or catch 113 in Figs. 8, 9 and 10 is raised higher above the base than is the catch 13, Figs. 5 and 6.

To release the bridle rings 14 or 19 shown in Figs. 5 to 11 inclusive, after the bridle wires are removed it is merely necessary to raise the bridle ring so that its arm will escape the projection or catch 13 or 113, and then reverse the operation of attaching it to the clamp. In Figs. 8, 9 and 10 the bridle ring may be swung up vertically 90° and then removed, without passing over the projection 113. In Fig. 6 the bridle ring has to be sprung so that the arm 16 can be raised over and engage the catch or projection 13 to permit the bridle ring to move in the arc of a horizontal circle.

In all forms of my invention the pigtail bridle ring is simply hooked into the vertical stirrup and permitted to hang freely therefrom.

Having thus described this invention in connection with illustrative embodiments thereof, to the details of which I do not desire to be limited, what is claimed as new and what is desired to secure by Letters Patent is set forth in the appended claims.

What I claim is:—

1. A new article of manufacture comprising a conduit or cable clamp provided with a hook portion to receive and hold a conduit or cable and with a base to lie against a wall or other suitable support, the base being provided with a vertical stirrup to coöperate with a locking hook of a bridle ring.

2. A new article of manufacture comprising a conduit or cable clamp provided with a hook portion to receive and hold a conduit or cable and with a base to lie against a wall of other suitable support, the base being provided with a vertical stirrup to coöperate with a locking hook of a bridle ring and with a catch to coöperate with the shank of a bridle ring and prevent its movement in one direction, the movement of the ring in the other direction being prevented by the contact of the hook with the vertical stirrup.

3. The combination of a conduit or cable clamp provided with a hook portion to receive and hold a conduit or cable and with a base to lie against a wall or other suitable support, the base being provided with a vertical stirrup to coöperate with a locking hook of a bridle ring, and with a catch to coöperate with the shank of a bridle ring, and a bridle ring having a locking hook and a shank to coöperate respectively with the vertical stirrup and catch on the base.

4. The combination of a conduit or cable clamp provided with a hook portion to receive and hold a conduit or cable and with a base to lie against a wall or other suitable support, the base being provided with a vertical stirrup to coöperate with a locking hook of a bridle ring, and a bridle ring having a locking hook to hook into and hang from said vertical stirrup, said locking hook being held above the surface of the base and beneath the stirrup.

5. The combination of a conduit or cable clamp provided with a hook portion to receive and hold a conduit or cable and with a base to lie against a wall or other suitable support, the base being provided with a vertical stirrup to coöperate with a locking hook of a bridle ring, and a bridle ring having a locking hook to hook into and hang from said vertical stirrup, and one or more runs of bridle wires mounted in said bridle ring, said bridle wires preventing the bridle ring from being swung far enough around to permit its extraction from the vertical stirrup.

6. The combination of a conduit or cable clamp provided with a hook portion to receive and hold a conduit or cable and with a base to lie against a wall or other suitable support, the base being provided with a vertical stirrup to coöperate with a locking hook of a bridle ring, and a bridle ring having a locking hook to hook into and hang from said vertical stirrup, a securing screw to secure the base to a wall or other suitable support, the locking hook of the bridle ring coöperating with the head of the securing screw to prevent the accidental removal of the bridle ring from the vertical stirrup.

HENRY W. PLEISTER.

Witnesses:
MARY R. RYAN,
ELIZABETH J. ROTH.